United States Patent [19]

Berglund

[11] Patent Number: 4,821,241

[45] Date of Patent: Apr. 11, 1989

[54] NOISE-CANCELLING STREAMER CABLE

[75] Inventor: Carl O. Berglund, Houston, Tex.

[73] Assignee: Teledyne Exploration Co., Houston, Tex.

[21] Appl. No.: 197,228

[22] Filed: May 23, 1988

[51] Int. Cl.[4] ............................................. G01V 1/38
[52] U.S. Cl. ........................................ 367/20; 367/24; 367/154; 174/101.5
[58] Field of Search ................. 367/22, 24, 153, 154, 367/159, 166, 169, 171, 901, 20; 174/101.5

[56] References Cited

U.S. PATENT DOCUMENTS

| | | | |
|---|---|---|---|
| 3,290,645 | 12/1966 | Pavey et al. | 367/24 |
| 3,335,401 | 8/1967 | Kerns | 340/7 |
| 3,369,216 | 2/1968 | Loper | 340/7 |
| 3,970,878 | 7/1976 | Berglund | 310/8.6 |
| 4,166,229 | 8/1979 | De Reggi et al. | 310/337 |
| 4,281,402 | 7/1981 | Kruka | 367/15 |
| 4,296,481 | 10/1981 | Weiss | 367/20 |
| 4,300,218 | 11/1981 | Kruka et al. | 367/165 |
| 4,694,436 | 9/1987 | Gelfand | 367/20 |

Primary Examiner—Deborah L. Kyle
Assistant Examiner—J. Woodrow Eldred
Attorney, Agent, or Firm—William A. Knox

[57] ABSTRACT

In a seismic streamer cable, stress sensors are co-located with the hydrophones in the cable. The stress sensors are responsive to mechanical stresses applied to the cable but it are substantially unresponsive to acoustic waves propagating in fluid media. The signal outputs from the stress sensors are combined with the signal outputs from the corresponding co-located hydrophones to cancel spurious signals due to bulge waves.

13 Claims, 4 Drawing Sheets

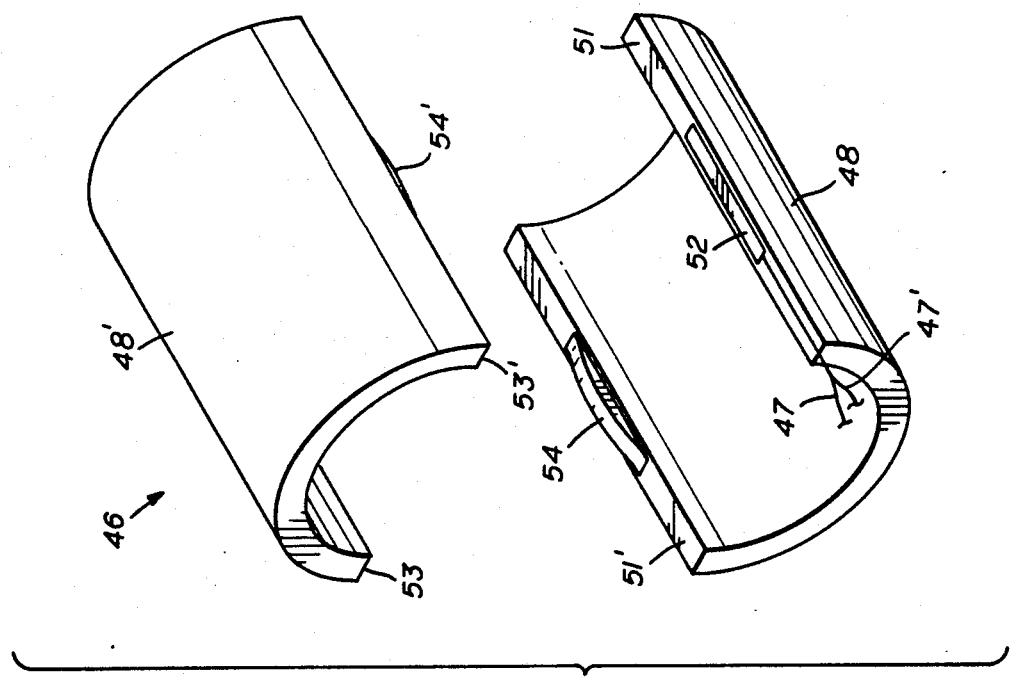
FIG. 4
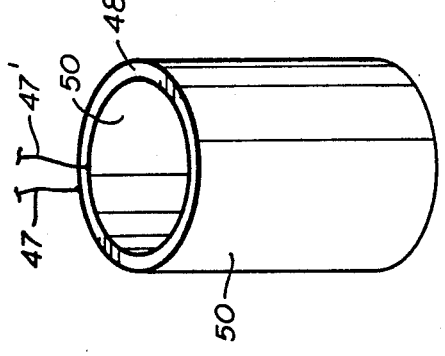
FIG. 3B
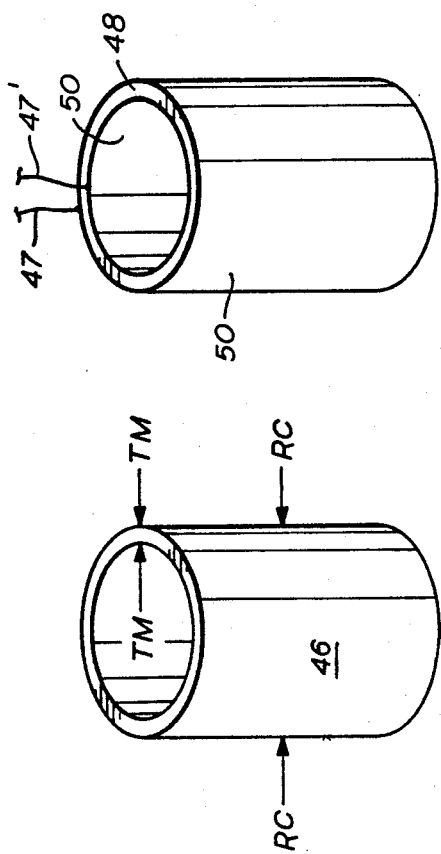
FIG. 3A
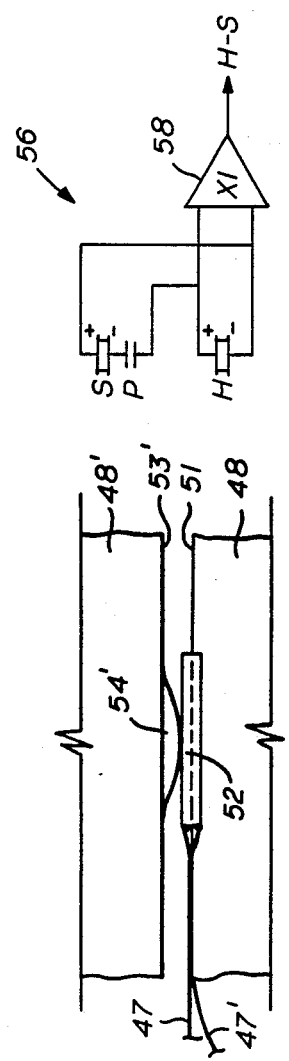
FIG. 6
FIG. 5

NOISE-CANCELLING STREAMER CABLE

BACKGROUND OF THE INVENTION

1. Field of the Invention

This invention is concerned with seismic streamer cables that are towed under the water for marine geophysical exploration. It is particularly concerned with removal of mechanically-induced noise. Related art might be found in class 367/15 or 367/20.

2. Discussion of the prior Art

In marine geophysical exploration, an acoustic source, such as an air gun, generates an impulse at or near the surface of the water. The seismic waves propagate from the source, through the water and into sub-ocean earth layers, whence they are reflected back to the surface. A plurality of hydrophones, mounted in a streamer cable detect the returning reflected acoustic waves, convert them to electrical signals, and transmit the signals to a signal utilization device aboard a towing vessel, through suitable transmission channels in the streamer cable. The signal transmission channels may consist of metallic conductors, optical fibers or a telemetric system.

Typically, a marine streamer cable consists of an elongated, flexible, tubular plastic jacket, perhaps 6.5 cm in diameter and several millimeters thick. The cable is divided into sections, each about 100 meters long. Each section may include as many as 100 hydrophones, divided into groups of three to ten hydrophones per group. Fifty or more sections may make up the complete streamer cable. Up to three stress members, which may be of stainless steel or of an aramid fiber, are threaded through each section to absorb the towing strain which may be several thousand kilograms. Cylindrical bulkheads, such as are described in U.S. Pat. No. 4,296,481, are disposed internally of the jacket at convenient intervals to preserve the structural integrity thereof. The bulkheads may be perforated for receiving the stress members and signal transmission channels therethrough. The sections are sealed at each end by connectors for mechanically and electrically interconnecting the cable sections to make up the complete streamer cable. Each section is filled with a floatation fluid, typically an aliphatic hydrocarbon such as a light odorless kerosene, to render the cable sections neutrally bouyant in the water.

In use, the stream cable is secured to a suitable ship by a lead-in cable. The ship tows the cable through the water at up to six knots along an assigned line of survey. Usually, the cable is towed at 15 to 20 meters beneath the water surface and is held at the desired depth along its length by means of depth-sensitive paravanes. When not in use, the cable is wound onto a large cable reel at the stern of the ship. Also aboard the ship, there are installed data-processing devices and archival-storage means for receiving the processed data.

In their passage through the water, both cable and ship generate a considerable amount of self-noise. Cable noise is minimized by streamlining the cable. Residual, horizontally-propagating propagating acoustic noise, due in part, for example, to the ship's screw, is removed by spatial filtering such as is taught by C. W. Kerns in U.S. Pat. No. 3,335,401. Acceleration noise, due to small vertical motion of the cable, may be removed by use of well-known acceleration-cancelling hydrophones.

Lurching of the ship, as it moves along the water surface in inclement weather, applies severe linear mechanical accelerations and jerk to the cable. Those mechanical motions create tube or bulge waves in the cable. Bulge waves propagate through the floatation fluid in a waveguide mode and stress the jacket by creating alternate mechanical bulging and necking of the flexible jacket. That action introduces severe, high-amplitude noise to the desired seismic reflection data. That is because the mechanical stressing of the jacket generates acoustic waves in the liquid floatation material. Those acoustic waves are detected by the hydrophones just as if they were valid seismic signals.

V. R. Kurka et al. in U.S. Pat. No. 4,281,402, provide a fluid spring that is attached between the ship and the seismic cable. The fluid spring minimizes the jerk transmitted to the cable. G. W. Loper, in U.S. Pat. No. 3,369,216 uses a resilient member between the ship and the cable, but he adds an inertia element to the cable, hopefully to reduce undesired motion. Although the above devices are useful, I have found that they are not completely effective.

A different approach was taken by V. Gelfand, in U.S. Pat. No. 4,694,436. He provides bulkheads having frustoconical end faces. The tapered end faces radially reflect undesired tube or bulge waves out of the jacket along the normal to the longitudinal axis. That idea is ingenious, but I have found that, because there is little difference between the acoustic impedance of the floatation fluid and that of the plastic bulkheads, the reflection coefficient of the bulkheads is small. For that reason, only a small portion of the undesired mechanical interference is removed by specular reflection from the conical end faces.

Known methods for reducing noise due to severe accelerations and jerk are, at best, only partially effective. I propose, therefore, to accept the presence of mechanically-generated noise. I will provide means for measuring and dynamically removing noise, due to mechanical stress, from desired seismic reflection signals.

SUMMARY OF THE INVENTION

In accordance with a preferred aspect of this invention, I provide a cable section including an elongated, flexible, tubular jacket, preferably of plastic, that is closed at both ends, for containing a volume of a floatation fluid. Within the jacket, there are mounted first means, such as hydrophones, for generating electrical signals in response to acoustic waves. Also, within the jacket, adjacent the first means, there are mounted second means, such as stress sensors, for generating electrical signals in response to mechanical stress impulses applied to the cable section. The stress sensors are substantially insensitive to acoustic waves. A third means, electrically coupled to the first and second means, is provided for combining the signals from the second means, in opposite polarity, with the signals from said first means.

In a preferred embodiment, the stress sensors are in the form of an open right cylinder of a piezo-electric substance, whose exterior surface is in intimate contact with the inner surface of the tubular jacket, whereas the hydrophones are resiliently mounted and physically isolated from the tubular jacket.

In accordance with a preferred method for practicing this invention, acoustic waves propagating through fluid media are detected and converted to a first time-varying electrical signal wave train. The magnitude of mechanical stresses applied to a seismic cable are measured and the measurements are converted to a second, electrical time-varying signal wave train. The second electrical time-varying signal wave train is then subtracted from the first electrical time-varying signal wave train, thereby to cancel noise due to mechanical stress. The signature of the second time-varying signal wave train is matched to the signature of the first time-varying signal wave train prior to the step of subtraction.

BRIEF DESCRIPTION OF THE DRAWINGS

The advantages and benefits of this invention will be better understood by reference to the detailed description of the preferred embodiment and the drawings wherein:

FIG. 3a shows the forces acting on a cylindrical transducer;

FIG. 3b shows one form of the stress sensor as used with this invention;

FIG. 4 illustrates a segmented form of the stress sensor;

FIG. 5 shows details of a transducer element and its mating protuberance;

FIG. 6 is a signal-receiving circuit for combining the output signals from a stress sensor and a hydrophone;

DETAILED DESCRIPTION OF THE PREFERRED EMBODIMENT

Figure 1:
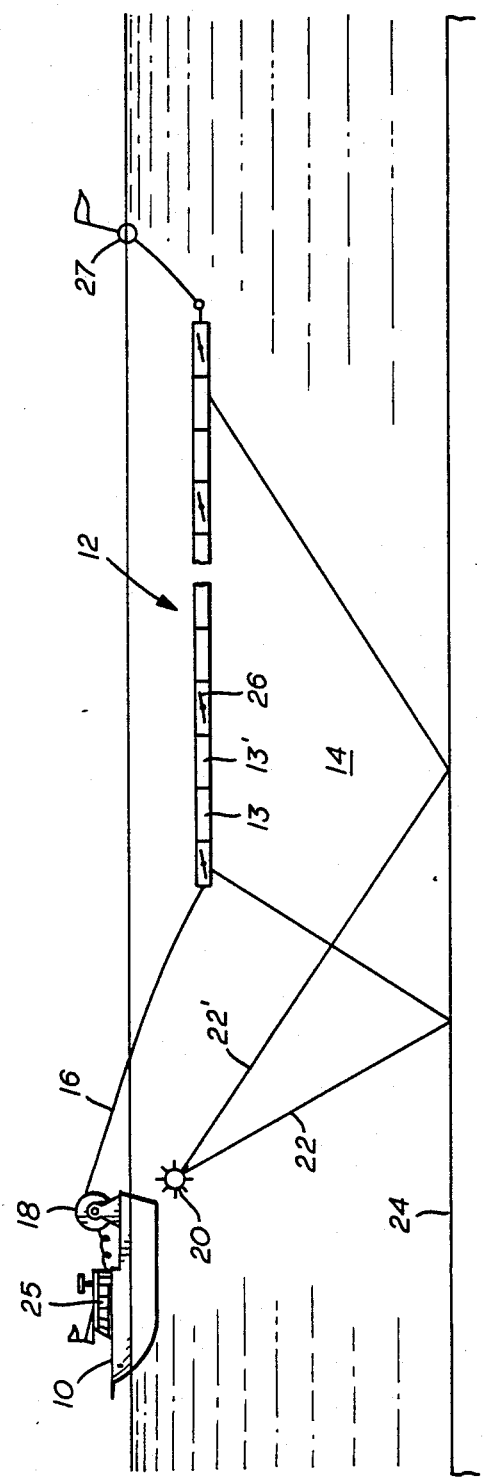
FIG. 1 illustrates a ship towing a sesmic cable through a body of water.

Referring now to FIG. 1, there is shown a ship 10 towing a seismic cable 12 through a body of water 14 by lead-in cable 16 that is attached to cable reel 18 on the ship's stern. Cable 12 is made up of a plurality of individual cable sections 13, 13' etc., that are electrically and mechanically fastened together. Periodically, an acoustic source 20, such as an air gun, is fired to create acoustic waves that travel along ray paths 22 and 22' to an earth layer 24 beneath the sea floor. Reflected from earth layer 24, the acoustic waves return towards the surface where they are detected by hydrophones (not shown in FIG. 1) in cable 12. The hydrophones convert the returning acoustic waves to electrical signals which are transmitted to a signal processing device 25 in ship 10. Depth-sensitive paravanes such as 26, secured at intervals along the cable 12, hold the cable at a constant depth along its length. A tail buoy 27 marks the far end of the cable, which may be several kilometers behind ship 10.

Figure 2:
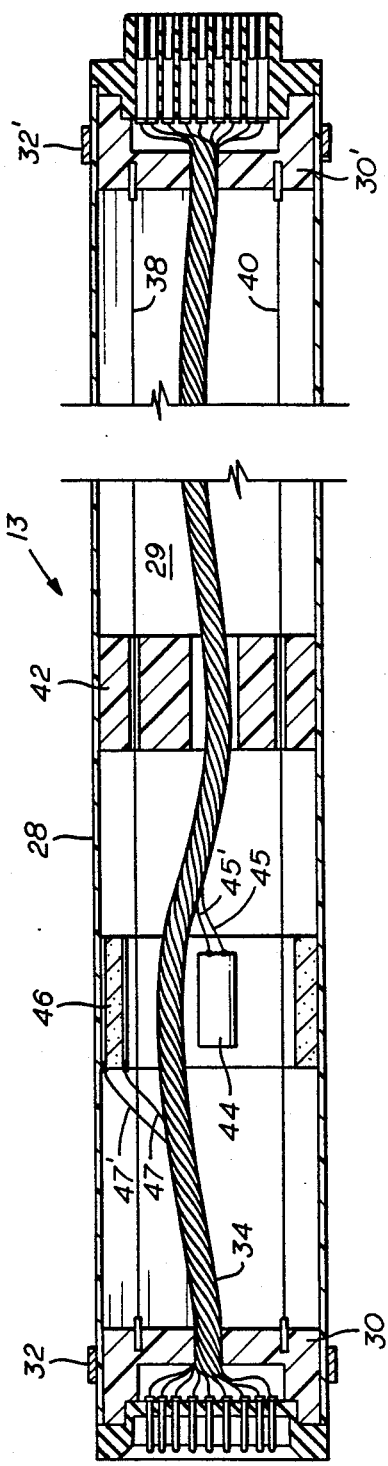
FIG. 2 is a cross section of a portion of a seismic cable section.

FIG. 2 is a cross section of a portion of a cable section 13 showing a typical arrangement of the component parts as applied to this invention. The section includes an elongated, flexible, tubular jacket or skin 28 which my be of plastic such as PVC. It is closed at each end by end plugs such as 30, 30'. The skin is secured to the end plugs by steel bands such as 32, 32'. A wire bundle, 34, provides signal transmission channels between the sensor packages in the cable section and the signal processing device 25 on the ship. Wires are shown for convenience' sake, but any other type of transmission channel may be used as desired. Tension members 38 and 40 assume the burden of the towing forces. Bulkheads such as 42 maintain the structural integrity of the jacket to prevent its collapse. The bulkheads are usually spaced-apart about every half-meter or less. They are usually made of a hard polycarbonate plastic.

Hydrophones 44, of any desired type, such as the $T=1$ described in my U.S. Pat. No. 3,970,878, are resiliently mounted in the cable by any well-known means, but they are pysically isolated from the cable jacket. Electrical leads 45,45' from the hydrophones deliver the hydrophone signals to the transmission channel 34. Typically, the hydrophone spacing may be about one meter. Cable section 13 is filled with a volume of floatation fluid 29 as before described. Acoustic waves propagating in the surrounding water and impinging upon the cable jacket, which is transparent to those waves, continue to propagate through the floatation fluid. The acoustic waves are then detected by the hydrophones such as 44. Thus, the hydrophones are responsive to acoustic waves propagating in fluid media.

Any type of mechanical shock wave that is applied to the cable section will, of course, create, in the floatation fluid, spurious acoustic waves which the hydrophones cannot distinguish from desired seismic waves. For purposes of this disclosure, an acoustic wave is defined as an elastic body wave in which particle motion is in the direction of propagation. An acoustic wave is sensed by a hydrophone as a series of alternate pressure increases and rarefactions. Acoustic waves are to be distinguished from mechanical or impactive stresses, that may be applied intermittantly to the cable, which stresses may generate acoustic waves in the floatation fluid but which are not necessarily, themselves, acoustic waves.

Adjacent each hydrophone, co-located therewith, there is mounted a stress sensor 46 for detecting mechanical or compressive forces. Preferably, stress sensor 46 takes the form of a hollow right cylinder, 2–3 cm long, open at the ends. It is exposed on all surfaces to the floatation fluid 29, except for the external surface which tightly contacts the inner surface of the cable jacket 28. Because the cable jacket is transparent to acoustic waves, any acoustic signals that arrive at cable section 13 will be applied uniformly to all surfaces of the stress sensor via fluid media, either via the surrounding water 14 or through the floatation fluid 29. To conserve space and insure that both the hydrophone and the stress sensor see the same signals, I prefer to mount the hydrophone inside the shell of the stress sensor the two sensors being freely flooded by the floatation fluid 29..

A thin-walled piezo-electric cylinder or tube, such as I prefer to use as a stress sensor, operates in the radial mode and has maximum response to a variation in mean diameter. As shown in FIG. 3a, it will respond primarily to a mechanical squeeze or radial compression as shown by arrows RC. Since, however, the wall has finite thickness, the cylinder will also have acoustic-wave response in the thickness mode as shown by arrows TM. When the same pressure is applied uniformly to all surfaces, the response in the thickness mode is minimal. I have found from laboratory measurements, that the thickness-mode response to acoustic waves, uniformly applied to all surfaces of the cylindrical stress sensor, is more than 60 dB down (1:1000) from the response of a hydrophone to the same acoustic wave. The stress sensor is therefore substantially insensitive to acoustic waves. For detailed specifications of the responses of piezo-electric ceramics, in different configurations, see page 25 of the brochure "Glennite piezo-ceramics" published by Gulton Industries Inc., a division of Edo Western of Salt Lake City Utah.

FIG. 3b shows details of one form of a piezo-electric stress ensor. Preferably it is a hollow cylinder 48 of barium titanate or lead zirconate such as might be supplied by Gulton Industries. A metallic coating 50 is sputtered on the inner and outer active surfaces of the piezo-electric ceramic. Electrical leads 47,47' may be soldered to the metallic coating to make the necessary electrical connections to wire bundle 34. Alternatively, a cylindrical plastic substrate might be substituted for the ceramic 48. A plastic piezo-electric film such as polyvinylidene fluoride (PVF) is then cemented to the inner and outer surfaces of the substrate in place of the metallic coatings 50. Such film is obtainable from Pennwalt Corp. of King of Prussia, PA.

In FIG. 2, the stress sensor 46 is shown as a cylinder, through which the wire bundle 34, the tension members 38 and 40 and hydrophone 44 (collectively termed the "carcass") must be threaded when the cable is assembled. In an alternative embodiment, it is more convenient to make stress sensor 46 in two or more segmented portions that can be wrapped around the carcass after assembly thereof.

Referring now to FIG. 4, the stress sensor 46 is formed of at least two half-shells 48, 48' of a hard polycarbonate plastic. Each of the half-shells 48 and 48' has two mating surfaces 51, 51' and 53, 53' respectively, that extend orthogonally with respect to the radial axes. A piezo-electric member 52 is mounted on one of the two mating surfaces, such as 51, of each of the half-shells. Note that a piezo-electric member is also mounted on mating surface 53 of half-shell 48' but is invisible in FIG. 4. The piezo-electric member may be a thin slab of ceramic embedded in one of the mating surfaces of the half-shell or it may be a PVF film cemented to the surface. Preferably, I secure protuberances 54, 54', of any convenient shape to each of the other of the two mating surfaces 51', 53' respectively, of the two half-shells 48, 48'. The two half-shells 48 and 48' are then assembled around the carcass and are secured together by any convenient means, so that the protuberance 54' one half-shell such as 48' contacts the piezo-electric member 52 of the other half-shell such as 48. The piezo-electric members of a pair of mating half-shells are preferably electrically coupled in parallel. FIG. 5 illustrates the arrangement of a protuberance 54 and a piezo-electric member 52 in greater detail.

In operation, an applied radially-compressive force will squeeze the two half-shells together forcing a protuberance to press against a corresponding piezo-electric member, causing the piezo-electric member to generate a signal in response to that compressive force. The output signal is a measure of the magnitude of the applied compressive force or stress. On the other hand, the segmented sensor configuration will be substantially unresponsive to uniformly-applied acoustic waves because those waves do not exert a differential compressive force on the segments that would squeeze the two segments together.

In the exemplary drawing of FIG. 2, a single hydrophone and a single stress sensor are shown. It should be understood that a plurality of co-located hydrophones and stress sensors will be used in actual practice.

In my preferred mode of operation, I provide suitable signal-receiving circuit means 56 for combining the output signals from the stress sensor 46 with the output signals from hydrophone 44, but with opposite polarity, to dynamically cancel by subtraction, spurious acoustic waves due solely to mechanical stress. A preferred analog signal-receiving circuit 56 is shown in FIG. 6. Hydrophone 44 is shown as an equivalent capacitor H; the stress sensor is shown as an equivalent capacitor S. The two are connected in parallel with opposite polarity as shown. The circuit may be mounted in a module near the two sensors in the cable, or it may be installed as part of the signal processing device 25 on board the ship. The actual location of the signal-receiving circuit forms no part of this invention.

The electrical power output of the hydrophone 44, which is usually of the bender capacitative type, will not necessarily match that of the stress sensor. It is required that the signature of the stress sensor be matched in phase and power output to that of the hydrophone in the presence of the same stressful impulse. Preferably, that is accomplished by adding a padding capacitor P in series with the stress sensor S. By way of example, but not by way of limitation, the capacitances of stress sensor 46 and hydrophone 44 may be 0.02 $\mu$f, while the capacitance of the padding capacitor P might be 0.1 $\mu$f. The same results could, of course, be obtained by means of a digital process such as cross-correlation, in the data-processing device 25, in place of the analog circuit shown in FIG. 6.

Laboratory tests have been made to show the efficacy of my invention. A hydrophone and a stress sensor, constructed according to the teachings of this disclosure, were mounted in a short cable jacket filled with floatation fluid, with separate electrical leads being coupled to each device. The leads were connected to the input channels of a two-channel oscillographic camera. The test unit was immersed in a water tank. In FIGS. 7–10 to follow, trace S is the output of the stress sensor and trace H is the output from the hydrophone. The test circuitry is shown at the top of each figure. The vertical lines represent ten-millisecond time intervals.

Figure 7:
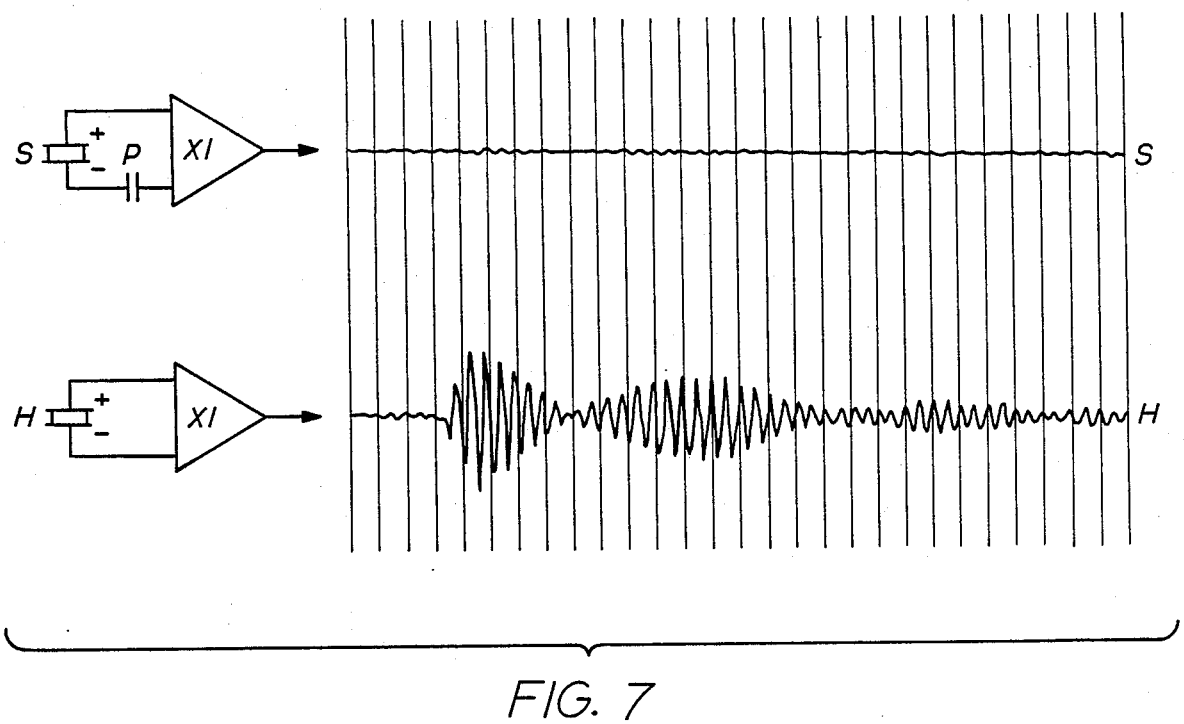
FIG. 7 shows the signatures of a stress sensor and a hydrophone in response to an acoustic wave.

In FIG. 7, an acoustic-wave type stimulation was generated in the water by tapping the side of the tank. Trace H, connected to the hydrophone, responded strongly to the acoustic wave as an electrical time-varying signal wave train; trace S, connected to the stress sensor, was substantially unresponsive.

Figure 8:
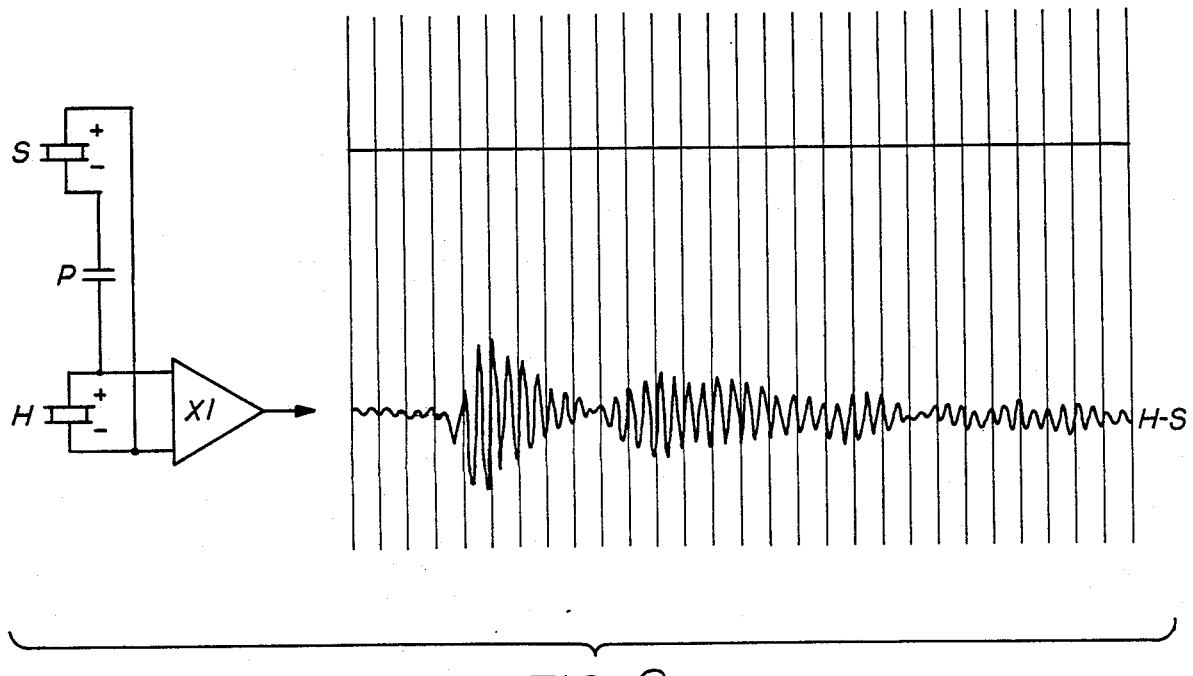
FIG. 8 is the combination of the responses of FIG. 7.

In FIG. 8, the stress sensor was coupled to the hydrophone in parallel, whereupon the sensors were again acoustically stimulated. In this test, trace S is of course dead. Trace H of FIG. 8 is substantially the same as trace H of FIG. 7. The results of FIG. 8 show that the hydrophone output, in the presence of an acoustic wave, is not distorted by the presence of the stress sensor in the circuit.

Figure 9:
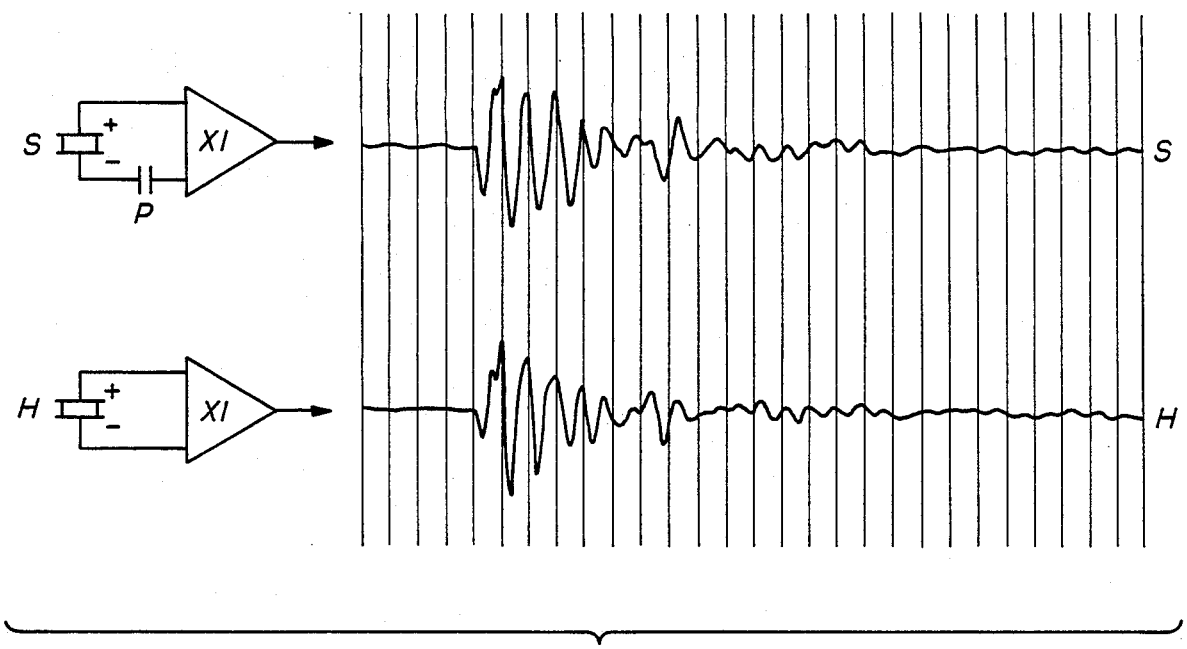
FIG. 9 illustrates the signatures of a hydrophone and a stress sensor when excited by a mechanical stress or impact applied to a cable section.

In FIG. 9, the cable jacket itself was physically perturbed by a mechanical impact simulating bulge-wave type stimulation. The signatures of traces H and S, due to the mechanical perturbation are virtually identical.

Figure 10:
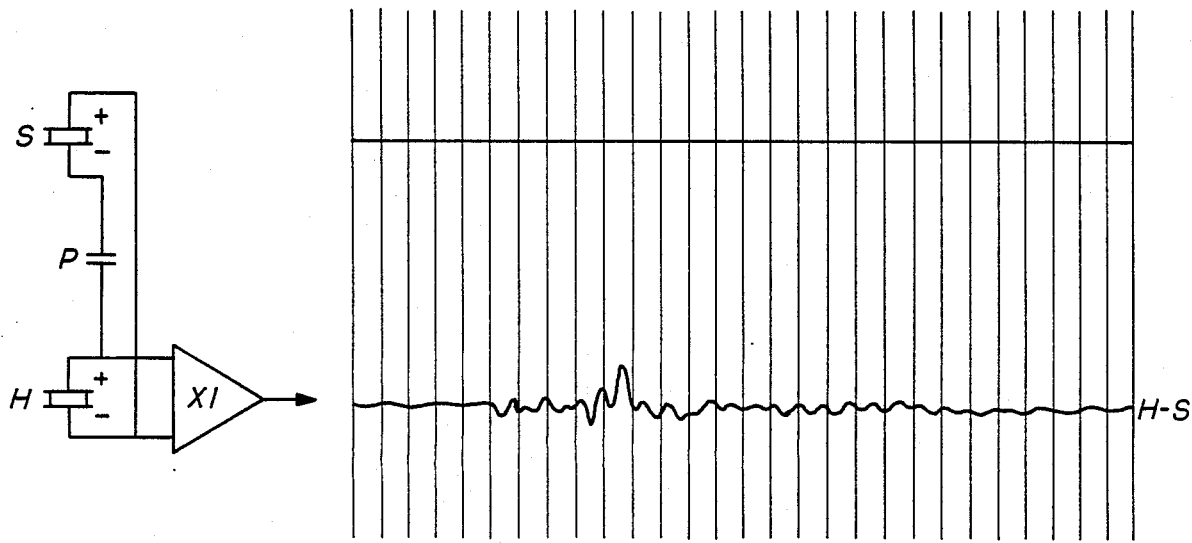
FIG. 10 is the response obtained by combining the signatures of FIG. 9 with opposite polarity.

Referring now to FIG. 10, the stress sensor output signal was combined, in opposite polarity, with the output signal from the hydrophone. The residual signature resulting from the subtraction of the two signals is shown on trace S-H.

FIG. 10 demonstrates that a substantial reduction in the level of spurious noise due to mechanical stress, is possible by using the teachings of my invention.

Those skilled in the art will consider variations to my teachings but which nevertheless will lie within the scope and spirit of this invention which is limited only by the appended claims. For example, if desired and convenient, some of the segmented stress sensors might be substituted in place of selected bulkheads

I claim as my invention;

1. A seismic cable section for use in a body of water, the cable section including an elongated, flexible, tubular jacket that contains a volume of floatation fluid, comprising:
   first means, mounted within said cable section, for generating electrical output signals in response to acoustic waves;
   second means, mounted in said cable section adjacent said first means, for generating electrical output signals in response to mechanical stress induced in said flexible tubular jacket; and
   third means for recombining the electrical output signals from said second means, in opposite polarity, with the electrical signals from said first means.

2. The cable section as defined by claim 1 wherein said second means is substantially unresponsive to acoustic waves propagating in liquid media.

3. The cable section as defined by claim 2, comprising:
   means, included with said third means, for matching the output signal level from said second means with respect to the output signal level from said first means when both said first and second means respond to a stressful impulse applied to the cable.

4. A seismic cable section for use in a body of water, the cable section including an elongated, tubular, flexible jacket containing a volume of floatation fluid, comprising:
   a plurality of spaced-apart hydrophones mounted within said jacket for providing electrical signals in response to acoustic waves propagating in fluid media;
   a corresponding plurality of hollow, cylindrical, spaced-apart stress sensors mounted adjacent each said hydrophone, the external surface of each said stress sensor being in physical contact with the inner surface of said flexible jacket, said stress sensors providing an electrical signals in response to radially-applied mechanical forces, said stress sensors being substantially unresponsive to acoustic waves propagating in a fluid medium;
   signal-receiving means electrically coupled to said hydrophones and to said stress sensors; and
   means incorporated with said signal-receiving means for combining, in opposite polarity, electrical signals from said stress sensors with electrical signals received from said hydrophones.

5. The seismic cable section as defined by claim 4, comprising:
   means for mounting said hydrophones interiorly of said hollow cylindrical stress sensors.

6. The seismic cable section as defined by claim 4, wherein said stress sensors are of a ceramic piezo-electric material.

7. The seismic cable section as defined by claim 4, wherein said stress sensors include a piezo-electric film mounted on a cylindrical substrate 8. The seismic cable section as defined by claim 4, wherein the stress sensors are comprised of at least two segmented portions.

9. The seismic cable section as defined by claim 5, wherein the configuration of the hydrophones and the stress sensors is such as to allow for free flooding of the hydrophones and stress sensors by the floatation fluid.

10. In a seismic streamer cable for use in a body of water, a method for dynamically cancelling spurious signals resulting from mechanical stress applied to said cable, comprising:
    detecting acoustic waves propagating in fluid media and converting said detected acoustic waves to a first time-varying electrical signal wave train having a characteristic signature;
    measuring the magnitude of mechanical stresses applied to the cable and converting the measurements to a second time-varying electrical signal wave train having a characteristic signature; and
    subtracting said second electrical signal wave train from said first electrical signal wave train.

11. The method as defined by claim 10, comprising the further step of:
    equalizing the signal levels of said first and second electrical signal wave trains.

12. The method as defined by claim 10, comprising:
    matching the signature of said second electrical signal wave train in phase and power output to the signature of said first electrical signal wave train in the presence of a stressful impulse applied to said streamer able.

13. The cable section as defined by claim 8 wherein the segmented portions of each said stress sensor comprise:
    first and second half shells of a rigid plastic material, each said half shell having two mating surfaces extending orthogonally to the radial axis;
    a piezo-electric member mounted on one of the mating surfaces of each said half shell;
    a protuberance mounted on the other of the mating surfaces of each said half shell; and
    means for mating said first and second half shells together such that the protuberance mounted on one of the mating surfaces of each said half shell contacts the piezo-electric member mounted on the other of the mating surfaces of each said half shell, thereby to form a single hollow cylindrical stress sensor from said at least two segmented portions.

* * * * *